(12) United States Patent
Wheeler

(10) Patent No.: US 6,312,760 B1
(45) Date of Patent: Nov. 6, 2001

(54) SURFACE COATINGS

(75) Inventor: Derek Alfred Wheeler, Bear Green (GB)

(73) Assignee: Disperse Limited (GB)

(*) Notice: Subject to any disclaimer, the term of this patent is extended or adjusted under 35 U.S.C. 154(b) by 0 days.

(21) Appl. No.: 09/463,130

(22) PCT Filed: Jul. 22, 1998

(86) PCT No.: PCT/GB98/02173

§ 371 Date: Jan. 19, 2000

§ 102(e) Date: Jan. 19, 2000

(87) PCT Pub. No.: WO99/05229

PCT Pub. Date: Feb. 4, 1999

(30) Foreign Application Priority Data

Jul. 22, 1997 (GB) .................................... 9715370

(51) Int. Cl.[7] .............................. B05D 3/02; B05D 3/10; B05D 3/12
(52) U.S. Cl. .......................... 427/243; 427/331; 427/336; 427/337; 427/372.2
(58) Field of Search .................................. 427/331, 336, 427/337, 243, 372.2

(56) References Cited

U.S. PATENT DOCUMENTS

| 4,040,857 | * | 8/1977 | Lissant | 106/243 |
| 4,486,333 | | 12/1984 | Sebba | 252/307 |
| 4,606,913 | * | 8/1986 | Aronson et al. | 424/59 |
| 4,999,198 | * | 3/1991 | Barnett et al. | 424/449 |

FOREIGN PATENT DOCUMENTS

| 328 037 A2 | 8/1989 | (EP) . |
| WO 93/13938 | 7/1993 | (WO) . |

* cited by examiner

*Primary Examiner*—Erma Cameron
(74) *Attorney, Agent, or Firm*—Renner, Otto, Boisselle & Sklar, LLP

(57) ABSTRACT

A method for coating the surface of a substrate and a surface coating made according to the method Involves contacting the surface with a dispersion of a film forming polymer containing droplets of a suspended biliquid foam or emulsion. Then the dispersion is allowed to dry so as to coat the surface with a coating comprising the droplets trapped within a film of the polymer.

12 Claims, 1 Drawing Sheet

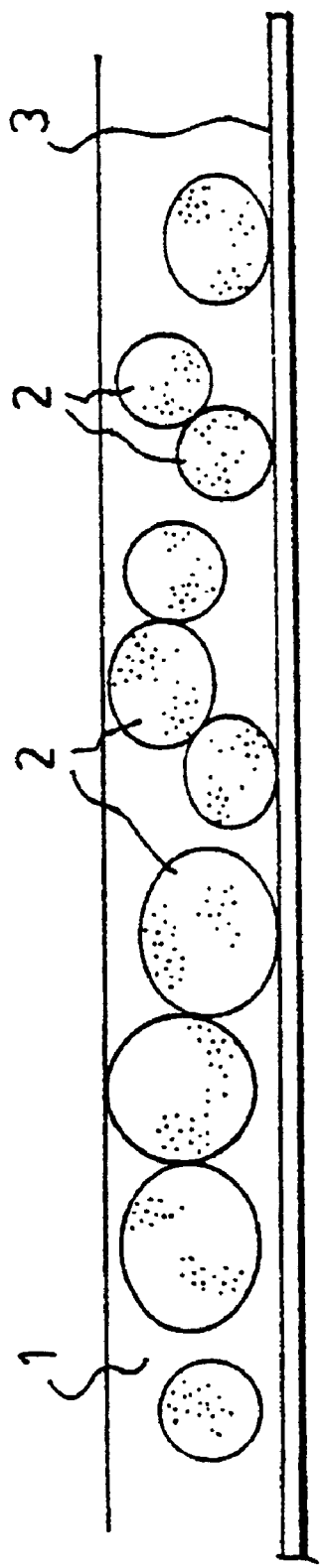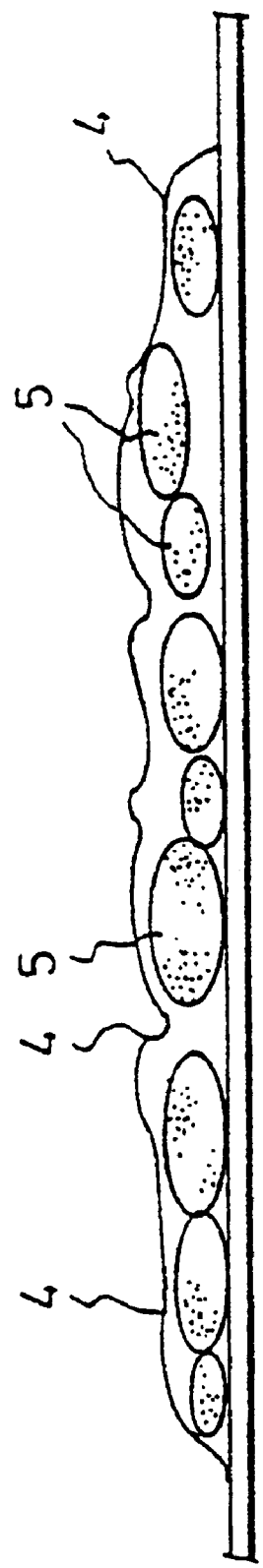

SURFACE COATINGS

The present invention relates to improved coatings particularly, but by no means exclusively to surface coatings wherein one or more oils or oil soluble substances are confined and protected indefinitely until they are released under pre-determined circumstances to perform their designated function.

The entrapment of oils or oil soluble substances (especially perfumes and coloured dye precursors) in microcapsules and their subsequent coating onto paper and other surfaces is well known in the art. Microcapsules of this type comprise individual droplets of oil or oil soluble substances (of size ranging from sub-micrometer to tens of millimeters in diameter) around which polymer walls have been formed by one of a number of chemical processess. Usually such microcapsules are prepared as an aqueous suspension which is then capable, with the addition of suitable modifying reagents, of being sprayed or printed onto paper and other surfaces. The object in so doing is usually to prevent the evaporation of volatile substances (for example, perfumes) or the degradation or chemical reaction of oil soluble species (for example, colourless dye precursors) until the microcapsules are broken by the application of shear forces by scratching or scraping the coated surface with the consequent release of their contents. Such coatings find major uses, for example, in the forms of "scratch and sniff" perfume coatings or NCR (No Carbon Required) paper.

However, such coatings and the use of microcapsules which form them suffer from a number of disadvantages.

Firstly, the process by which microcapsules are formed is a lengthy and uncertain one in which control over temperature, pH and the absence of any form of contamination is essential. The formation of microcapsules, for example, by complex coacervation from gelatine and an anionic complexing species such as gum acacia takes many hours and demands very close control of pH, temperature and cooling rate. Similarly, the formation of microcapsule walls from aminoplast resins, such as malamin-formaldehyde or urea-formaldehyde takes at least eight hours during which precise control over all controllable parameters needs to be effected. Moreover, the effectiveness and completeness of any individual encapsulation process and therefore the quality of the microcapsules so formed depends largely on the chemical nature of the oil and/or oil soluble substances being encapsulated.

A further disadvantage of microcapsulation is that the thickness and therefore the strength of the microcapsule wall is variable and is not easily controllable and varies with the nature of the oil or oil-soluble substances being encapsulated. Thus microcapsules made by the same process but from different oils may have widely differing strengths and resistance to breakage during the printing process and during subsequent storage and use.

A yet further disadvantage of microencapsulation is the limited number of chemical processes and the limited number and type of polymeric wall materials which are available to form them. The choice as to the properties of the wall materials is consequently limited with regard to their flexibility, tensile strength, permeability, chemical inertness, mammalian toxicity and other properties including solubility and melting point (if any). In addition, some of the chemicals commonly used in the wall forming process are themselves highly irritating and may themselves be toxic such, for example, as the use or release of formaldehyde (a potential carcinogen) during the manufacture of aminoplast resin walls. Moreover, the remaining traces of formalin in the resulting microcapsule suspension are virtually impossible to eliminate to below acceptable levels for uses of microcapsules and requires special precautions to be taken during the manufacturing process.

A further disadvantage of microcapsules which are used in surface coatings is that the microcapsule walls have a limited deformability, that is, they can only be deformed to a limited extent during the surface coating process (typically a printing process) before they will rupture and prematurely release their contents. The extent of their ability to deform when squeezed, for example, between nip rollers on a printing press set with a gap smaller than the average diameter of the microcapsules, depends partly upon the tensile properties of the polymer wall, its thickness and on the size of the microcapsules being squeezed.

Other methods for coating paper and like surfaces with mobile oils are known but these are generally inferior to coating with microcapsules since they do not effectively trap and protect the oils from evaporation or degradation during manufacture and subsequent storage prior to use. For example, perfumes may be sprayed or otherwise coated onto paper surfaces in order to give paper products a pleasant smell—as for instance, with perfumed drawer liners wherein the coating is sprayed on perfume and not a microencapsuled perfume. Such products have a limited shelf life (because of the premature evaporation of the perfume) and the outer packaging of the product is usually the only (and relatively ineffective) barrier to loss of perfume or other volatile substances during storage.

The present invention addresses the above described problems and disadvantages, and provides a surface coating containing entrapped oils or oil soluble substances which can be manufactured quickly, efficiently and reproducibly wherein a polymer film protecting the oils droplets is of a controllable thickness and strength which is largely independent of the nature of the entrapped oil droplets.

Furthermore, the invention provides a coating wherein the entrapped oils can be caused to be released predictably by making use of known properties of a resistance to abrasion, chemical inertness, opacity, solubility, melting point and other chemical and physical properties.

Furthermore, the invention provides a means of surface coating capable of releasing oils or oil soluble materials without the need to use toxic or potentially toxic materials.

According to a first aspect of the invention there is provided a method for coating the surface of a substrate comprises the steps of:

contacting the surface with a dispersion of a film forming polymer, said dispersion containing droplets of a suspended biliquid foam or emulsions; and allowing the dispersion to dry so as to coat the surface with a coating comprising the droplets trapped within a film of said polymer.

In this way, a surface coating is provided which can exhibit the above described advantages. Furthermore the range and number of soluble or suspendible film forming polymers is very great compared to the numbers of polymers available, for example, to form the walls of microcapsules and the variety of useful properties available with the present invention compared to coatings containing microcapsules is, consequently, very much greater and wider.

Preferably, a biliquid foam is used. Biliquid foams are systems bearing some resemblance to gas foams, which exhibit some different and, in the context of the present invention, more preferable properties to those exhibited by emulsions, including the ability to be suspended in aqueous gel systems. Biliquid foam are described in the following literature articles by Sebba: "Biliquid foams", J. Colloid and Interface Science, 40 (1972) 468–474; and "The Behaviour of Minute Oil Droplets Encapsulated in a Water Film", Colloid Polymer Sciences, 257 (1979) 392–396. Neither of these articles suggest that biliquid foams might be used in a polymeric surface coating system. Biliquid foams can be made quickly and efficiently from non-polar materials, such as oils and oil soluble substances, and a hydrogen bonded material (typically water but including alcohols and glycols), provided that both phases are liquid during manufacture.

Preferably, an aqueous dispersion of the polymer is used. Water has the advantages of being economical, environmentally friendly and permitting a wide ranging choice of compatible polymers.

The biliquid foam or emulsion may comprise droplets of an oil or an oil soluble substance.

The dispersion of polymer may comprise a solution, suspension or gel.

According to a second aspect of the invention there is provided a surface coating made according to the above described method and comprising droplets of a non-polar substance trapped within a film of a polymer.

The polymer film may be selected so that the non-polar substance is releasable from the coating upon the application of shear forces to the polymer film. In the instance where the substance is, or contains, a perfume, a "scratch and sniff" coating is produced.

The polymer film may be selected so that the non-polar substance is releasable from the coating by the action of a chemical release agent on the polymer. The non-polar substance may be released at a predetermined pH, or by contact of the polymer film with water.

The polymer film may be selected so that the non-polar substance is released from the coating by the application of heat to the polymer.

The polymer film may be partially or wholly crosslinked.

It should be noted that all of these release mechanisms are difficult or impossible to achieve with prior art technology because of the limited choice of wall materials from which microcapsules can be made as noted above.

BRIEF DESCRIPTION OF THE DRAWINGS

Methods and coatings in accordance with the invention will now be described with reference to the accompanying drawings in which:

FIG. 1 shows a biliquid foam in an aqueous dispersion of polymer; and

FIG. 2 shows a surface coating after drying of the dispersion of FIG. 1.

FIGS. 1 and 2 illustrate a method for coating the surface 3 of a substrate comprising the steps of:

contacting the surface 3 with a dispersion 1 of a film forming polymer, said dispersion 1 containing droplets 2 of a suspended biliquid foam or emulsion; and allowing the dispersion 1 to dry so as to coat the surface 3 with a coating comprising the droplets 5 trapped within a film 4 of said polymer.

The dried polymer film thus becomes a surface coating containing a plurality of suspended but intact oil droplets protected by the polymer film and depending for their integrity, strength, ease and method of rupture, chemical inertness and permeability on the structure, thickness and nature of the film-forming polymer material in its dried form.

It is preferable to use a biliquid foam, although the use of emulsions is within the scope of the invention.

FIGS. 1 and 2 indicate diagrammatically the microscopic structure and appearance of a biliquid foam entrapped in an aqueous polymer solution or dispersion coated onto a surface before drying (FIG. 1) and after drying (FIG. 2). In FIG. 1, the aqueous polymer dispersion 1 is coated onto a suitable surface 3. Droplets of biliquid foam 2 are trapped in the dispersion. These droplets are typically 1 to 10 micrometers in diameter and may have a concentration in the aqueous polymer dispersion of 1 to 60 percent by weight but typically 5 to 25 percent by weight. FIG. 2 indicates the appearance of the dried polymer film from which partially all the water has evaporated 4. The thickness of this film depends upon the amount of dispersion used to coat the surface and the concentration of the polymer within it. The biliquid foam droplets 5 can be seen to be somewhat flattened (to an extent dependent upon the film thickness) but intact, with a surface covering of polymer film 4.

It is possible to make biliquid foams which are easily dispersibile in aqueous gel and polymer suspensions comprising mainly natural oils (for example, Soya and Sunflower), kerosenes, mineral oils, perfumes, organic solvents (for example, hexane, cyclohexane, chloroform, carbon tetrachloride and the like), silicone oils and their derivatives (such as dimethicones and cyclomethicones), fatty alcohols and their derivatives (for example isopropyl palmitate, isopropyl myristate) and most other non water-soluble liquids. The present invention may utilise any or all of the above singly or in combination or any other oil or non polar substance capable of existing in liquid form in the temperature range −50° C. to 200° C. but typically 3° C. to 90° C. and preferably 10° C. to 30° C.

Water-dispersible or water-soluble film forming polymers of many types are well known and include cellulose derivatives (for example, carboxymethylcellulose, hydroxyethylcellulose, cetylhydroxycellulose, hydroxypropylcellulose, hydroxpropylmethylcellulose, hydroxyethylmethylcellulose, methylcellulose and the like), gelatine, gum arabic, gum acacia, gellan gum, shellac, carragean, natural starches, xanthane gums, alginates, dextrins, polyvinyl alcohol, polyvinyl pyrollidone, polyamides, film-forming emulsion polymers (for example, a plurality based upon or containing homo and copolymers of vinyl and acrylic esters and polymers and copolymers of styrene) and other water dispersible or water soluble film forming agents known in the art. The present invention includes the use of all of the above singly or in combinations.

The invention provides a means of controlling the rate of release of the entrapped oil by exercising control over the concentration of the film forming polymer in solution or suspension and thereby controlling the thickness and strength of the film deposited.

The invention also allows for release of the oil by dissolution of the film by contact with water or other polar solvent. In addition, the water-soluble or water dispersible film forming polymer may be partially or wholly crosslinked to render it partially or totally water insoluble by which means the rate of release of the entrapped biliquid foam may be controlled by the speed or absence of dissolution when the film makes contact with water or other polar liquid in which it might otherwise be soluble. Alternatively, the choice of film-forming polymers may be such that it is sensitive to acidity or alkalinity so that the release of the entrapped oil may be determined by a change of pH or by the presence of another chemical species with which the film-forming polymers may react, so rendering it permeable or unstable. The film may alternatively comprise a polymer which melts at a known and predetermined temperature to release the entrapped oil.

In one embodiment, the entrapped biliquid foam may comprise a perfume which, when dried into a suitable coating, will behave and perform precisely as a conventional, microencapsulated "scratch and sniff" perfume as previously described.

In another embodiment, a perfume or deodorising composition is entrapped according to this invention in a water soluble film on the inner surfaces of an ostomy or colostomy pouch or similar device so that the perfume or deodorising fluid is released on contact with water when the pouch is used so masking or neutralising any disagreeable odour.

In yet another embodiment, the biliquid foam may be entrapped in a water soluble polymer film on a suitable applicator together with other reagents (for example, an abrasive material, such as a pumice or water soluble antimicrobial agents) to form a dry surface which when wetted becomes an effective hard surface cleansing product.

In yet another embodiment, the film forming polymer may comprise a brittle film which ruptures easily when deformed so releasing the entrapped non polar substance. In one application of this embodiment, the coating may be coated onto a flexible film which may, for example, be shrunk onto the cap of a consumer product such that if the flexible film is removed, the coating film ruptures so releasing the non-polar substance which, in this instance, may be the colourless precursor of a coloured dye which, on release, undergoes a chemical change to become highly coloured. Thus this embodiment gives a clear indication whether or not a closure has been tampered with.

In a further embodiment, the polymer film may consist of a cross-linked polymer or any polymer capable of giving up water slowly (for example, a calcium or magnesium alginate) so that as the film dries and shrinks, the entrapped biliquid foam, which may consist primarily of a perfume suitable for use as a household air freshener, is gradually and progressively exposed to the air and is thereby able to evaporate so perfuming the surroundings continuously over an extended period of time.

EXAMPLE 1

Water Soluble Film Containing Mineral Oil

An aqueous dispersion was made consisting of the following:

|  | % |
| --- | --- |
| 50% aqueous solution of PVP (polyvinyl pyrollidone) K30 (IPS Limited) | 68.0 |
| Mineral oil biliquid foam BLF1 | 30.0 |
| 2% aqueous dispersion of xanthane gum | 2.0 |
|  | 100.0 |

The composition of BLF1 was as follows:

|  | % |
| --- | --- |
| Light mineral oil | 90.05 |
| De-ionised water | 9.00 |
| Polyoxyethylene (3) lauryl ether ("Volpo L3", Croda) | 0.90 |
| Lauryl betaine ('Empigen BB', Marchon) | 0.05 |
|  | 100.00 |

The biliquid foam was produced by blowing air through the aqueous solution of the lauryl betaine to produce a foam, and a mixture of the ethoxylated ether and the mineral oil was added with gentle stirring. There was thus obtained a biliquid foam as detailed above.

The PVP was dissolved by stirring into water at room temperature (20° C.) and gently warming to 50° C. When dissolution was complete, the resulting solution was cooled back to room temperature and the biliquid foam, BLF1 was stirred in, avoiding the formation of air bubbles. Finally, the xanthane gum solution was added and the whole homogenised by further gentle stirring. Approximately 0.5 grams of the resulting polymer dispersion was spread evenly onto a glass microscope slide and allowed to dry overnight. There was thus obtained a dry, firm, glossy polymer film containing small droplets of mineral oil (approximately 20 micrometers in average diameter) which lent the film an opalescent appearance. In its dry state, this film adhered to the slide and retained its oil content indefinitely, but once dispersed in water at room temperature, the film dissolved thus releasing its oil content into the water.

EXAMPLE 2

Water Soluble Perfume Film

An aqueous dispersion was formed with the following composition:

|  | % |
| --- | --- |
| 50% aqueous solution of PVP K30 (IPS Limited) | 48.0 |
| Perfume oil/IPM biliquid foam BLF2 | 50.0 |
| 2% aqueous dispersion of xanthane gum | 2.0 |
|  | 100.0 |

The biliquid foam BLF2 was of similar composition to BLF1 in Example 1 above except that light mineral oil was replaced by a 50% solution of perfume oil (IFF) in isopropyl myristate and the polyoxyethylene (3) lauryl ether was replaced with polyoxyethylene (10) olyl ether. The method of manufacture of the biliquid foam and the final polymer dispersion was as given in example 1. When spread onto a glass slide and dried as in example 1 there was obtained a polymer film which retained its dry glossy, opalescent appearance until placed in water, when it gradually dissolved releasing its perfume oil content.

EXAMPLE 3

Insoluble Silicone Film
The composition was as follows:

| | % |
|---|---|
| 46% dispersion of poly butyl acetate/methyl methacrylate copolymer ("Mowilith DM772", Harlow Chemical Co.) | 50.0 |
| Dimethicone biliquid foam BLF3 | 50.0 |
| | 100.0 |

The biliquid foam BLF3 was manufactured as in example 1 except that the mineral oil was replaced by silicone oil 200/350 (Dow Corning).

When spread on a glass slide and allowed to dry as before, there was obtained a dry, glossy polymer film having an opalescent appearance which was insoluble in water but which gradually released its content of silicone oil as the temperature increased above 50° C.

What is claimed is:

1. A method for coating the surface of a substrate comprising the steps of:
    contacting the surface with a dispersion of a film forming polymer, said dispersion containing droplets of a suspended biliquid foam or emulsion; and
    allowing the dispersion to dry so as to coat the surface with a coating comprising the droplets trapped within a film of said polymer.

2. A method according to claim 1, in which a biliquid foam is used.

3. A method according to claim 1, in which an aqueous dispersion of the polymer is used.

4. A method according to claim 1, in which the biliquid foam or emulsion comprises droplets of an oil or an oil soluble substance.

5. A method according to claim 1, in which the dispersion of polymer comprises a solution, suspension or gel.

6. A surface coating made according to claim 1, in which the biliquid foam or emulsion includes droplets of a non-polar substance trapped within a polymer film.

7. A surface coating according to claim 6, in which the polymer film is selected so that the non-polar substance is released from the coating upon the application of shear forces to the polymer film.

8. A surface coating according to claim 6, in which the polymer film is selected so that the non-polar substance is released from the coating by the action of a chemical release agent on the polymer.

9. A surface coating according to claim 8, in which the non-polar substance is released at a specified pH or pH range.

10. A surface coating according to claim 8, in which the non-polar substance is released by contact of the polymer with water.

11. A surface coating according to claim 6, in which the polymer film is selected so that the non-polar substance is released from the coating by the application of heat to the polymer.

12. A surface coating according to claim 6, in which the polymer film is partially or wholly crosslinked.

* * * * *